United States Patent
Janus et al.

(10) Patent No.: US 10,110,374 B2
(45) Date of Patent: *Oct. 23, 2018

(54) PREVENTING PATTERN RECOGNITION IN ELECTRONIC CODE BOOK ENCRYPTION

(71) Applicant: Intel Corporation, Santa Clara, CA (US)

(72) Inventors: Scott Janus, Rocklin, CA (US); Jason Martin, Beaverton, OR (US); Uday Savagaonkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/354,527

(22) Filed: Nov. 17, 2016

(65) Prior Publication Data

US 2017/0070342 A1 Mar. 9, 2017

Related U.S. Application Data (63) Continuation of application No. 13/996,890, filed as application No. PCT/US2011/068108 on Dec. 30, 2011, now Pat. No. 9,531,916.

(51) Int. Cl.
*H04L 9/06* (2006.01)
*G06F 21/62* (2013.01)
(Continued)

(52) U.S. Cl.
CPC ........ *H04L 9/0637* (2013.01); *G06F 21/6209* (2013.01); *G06T 1/20* (2013.01); *H04N 1/4486* (2013.01); *H04L 2209/08* (2013.01)

(58) Field of Classification Search
CPC ..... H04L 9/06; H04L 9/00; H04L 9/30; H04L 9/18; G06F 7/725; G06F 21/6209
(Continued)

(56) References Cited

U.S. PATENT DOCUMENTS 6,094,483 A * 7/2000 Fridrich ................ G06T 1/0021
375/E7.026
7,159,112 B1 1/2007 Williams
(Continued)

FOREIGN PATENT DOCUMENTS

JP 2003-091612 3/2003
WO 2013/101185 7/2013

OTHER PUBLICATIONS

Alireza Jolfaei, "Image Encryption Using Chaos and Block Cipher", Published by Canadian Center of Science and Education, vol. 4, No. 1 Jan. 2011, pp. 172-185.*

(Continued)

*Primary Examiner* — Farid Homayounmehr
*Assistant Examiner* — Sanchit K Sarker
(74) *Attorney, Agent, or Firm* — Barnes & Thornburg LLP (57) ABSTRACT

In general, in one aspect, noise is injected into a bitmap associated with content to be presented on a display to create a noisy bitmap. The noisy bitmap is encrypted using electronic code book (ECB) encryption. The resulting ciphertext does not include recognizable patterns from the content as is typical with ECB encryption. The injection of noise may include modifying pixel values for at least a subset of pixels in the bitmap. The pixel values may be modified by using a counter, a known modification pattern, or a random number generator. The bitmap may be analyzed to determine how the bitmap can be modified to maximize the randomness of the bitmap while ensuring that the noisy bitmap is visually perceptually similar when presented. The noise may be injected into a block of pixels prior to the block being encrypted.

20 Claims, 7 Drawing Sheets

(51) Int. Cl.
*H04N 1/44* (2006.01)
*G06T 1/20* (2006.01)

(58) Field of Classification Search
USPC .......................................................... 380/28
See application file for complete search history.

(56) References Cited

U.S. PATENT DOCUMENTS

| | | | | |
|---|---|---|---|---|
| 7,305,084 | B2* | 12/2007 | Hawkes | H04L 9/0637 380/277 |
| 8,073,990 | B1* | 12/2011 | Baron | G06F 13/28 710/22 |
| 8,355,499 | B2* | 1/2013 | Asnaashari | H04L 9/28 380/28 |
| 9,531,916 | B2* | 12/2016 | Janus | G06F 21/6209 |
| 2002/0085734 | A1* | 7/2002 | Keeney | G06T 9/007 382/100 |
| 2003/0067474 | A1* | 4/2003 | Fenney | G06F 21/121 345/582 |
| 2004/0153653 | A1* | 8/2004 | Abhyankar | G06F 21/6209 713/179 |
| 2004/0174998 | A1 | 9/2004 | Youatt | |
| 2007/0040780 | A1* | 2/2007 | Gass | G02F 1/134363 345/87 |
| 2007/0058807 | A1* | 3/2007 | Marsh | G06F 21/10 380/44 |
| 2007/0286513 | A1* | 12/2007 | Liu | H04N 1/4051 382/254 |
| 2008/0089412 | A1* | 4/2008 | Ugur | H04N 19/597 375/240.12 |
| 2008/0198923 | A1 | 8/2008 | Gramelspacher | |
| 2009/0136041 | A1* | 5/2009 | Tsu | G06F 21/84 380/278 |
| 2009/0214033 | A1* | 8/2009 | Nakagata | G09C 5/00 380/243 |
| 2009/0252323 | A1* | 10/2009 | Cooper | G06F 21/6218 380/54 |
| 2009/0300372 | A1* | 12/2009 | Lee | G06F 21/79 713/193 |
| 2010/0024036 | A1 | 1/2010 | Morozov | |
| 2010/0026690 | A1* | 2/2010 | Parikh | G06F 9/52 345/502 |
| 2010/0042828 | A1* | 2/2010 | Masui | G09C 5/00 713/153 |
| 2010/0142710 | A1* | 6/2010 | Chrysler | G06F 21/6227 380/277 |
| 2010/0169645 | A1 | 7/2010 | Mcgrew | |
| 2011/0197199 | A1* | 8/2011 | Isaka | G06F 21/50 718/107 |
| 2011/0231636 | A1* | 9/2011 | Olson | H03M 13/158 712/222 |
| 2011/0311042 | A1* | 12/2011 | Cheddad | G06F 21/602 380/28 |
| 2012/0206657 | A1* | 8/2012 | Bratt | H04N 9/646 348/708 |
| 2014/0205085 | A1* | 7/2014 | Janus | G06F 21/6209 380/28 |
| 2017/0034523 | A1* | 2/2017 | Ebrahimi | H04N 19/67 |
| 2017/0070342 | A1* | 3/2017 | Janus | G06F 21/6209 |
| 2018/0035120 | A1* | 2/2018 | Wei | H04N 19/44 |

OTHER PUBLICATIONS

Mazleena Salleh, Suhariah Ihrahim, Ismail Fauzi Isnin, "Enhanced Chaotic Image Encryption Algorithm Based on Baker's Map," Universiti Teknologi Malaysia, Skudai 81 300, Johore, Malaysia, Jurnal Teknologi, 39(D) Dis. 2003:1-12.*

Mazleena Salleh, Suhariah Ihrahim, Ismail Fauzi Isnin "Enhanced Chaotic Image Encryption Algorithm Based on Baker's Map" Universiti Teknologi Malaysia, Skudai 81 300, Johore, Malaysia, Jurnal Teknologi, 39(D) Dis. 2003:1-12; (Year: 2003).*

Alireza Jolfaei, "Image Encryption Using Chaos and Block Cipher",Published by Canadian Center of Science and Education,vol. 4, No. 1 Jan. 2011, pp. 172-185; (Year: 2011).*

Alireza Jolfaei, "Image Encryption Using Chaos and Block Cipher," Published by Canadian Center of Science and Education, vol. 4, No. 1, Jan. 2011, pp. 172-185.

Chi-Wu Huang et al., "Image Observation on the Modified ECB Operations in Advanced Encryption Standard," 2011 International Conference on Information Security (i-Society): 264-9;508, IEEE (2011).

Supplementary European Search Report and Search Opinion received for Application No. 11878504.7-1870/2798769 PCT/US2011068108, dated Sep. 14, 2015, 6 pages.

Alfred J. Menezes et al., "Block Ciphers," in Handbook of Applied Cryptography, CRC Press (Discrete Mathematics and Its Applications) 223 (1st Ed. 1996).

Shujun Li et al., "Chaos-Based Encryption for Digital Images and Videos," in Multimedia Security Handbook, CRC Press (Borko Furht & Darko Kirovski, eds. 2004).

Japan Patent Office Notice of Reasons for Rejection for Application No. 2014-548782, dated Sep. 15, 2014, 2 pages.

Anthony T.S. Ho, "Digital Image-in-Image Watermarking for Copyright Protection of Satellite Images Using the Fast Hadamard Transform," Proceedings of IEEE International Geoscience and Remote Sensing Symposium 2002, vol. 6, pp. 3311-3313.

International Search Report and Written Opinion received for PCT Patent Application No. PCT/US2011/068108, dated Sep. 26, 2012, 8 pages.

International Preliminary Report on Patentability and Written Opinion received for PCT Patent Application No. PCT/US2011/068108, dated Jul. 1, 2014, 6 pages.

* cited by examiner

FIG. 1

ECB ENCRYPTION

ECB DECRYPTION

FIG. 2

ORIGINAL IMAGE

ECB ENCYPTED
(PATTERNS RECOGNIZABLE)

*FIG. 3*

MODIFIED IMAGE

ECB ENCYPTED (ROBUST)

PREVENTING PATTERN RECOGNITION IN ELECTRONIC CODE BOOK ENCRYPTION

BACKGROUND

The amount, availability and accessibility of information in digital format continues to expand. For example, consumer electronics devices such as media players (e.g., iPod Touch), smart phones (e.g., iPhone, Blackberry, Android phone, Windows phone), tablets (e.g., iPad), computers (e.g., lap-tops, desk tops), and Interned enabled televisions may be able to access, receive, transmit, share, generate, and/or store digital information and present a semantic interpretation (visual presentation) of the digital information on a display or print the semantic interpretation. The consumer electronics devices may receive/access digital information from, for example, other consumer electronic devices networked thereto, the Internet and/or other public/private networks.

The digital information may include, for example, general information, user specific information and/or confidential information. Access to user specific information may be limited with the use of user authentication security features (e.g., user IDs and passwords). Access to confidential information may require use of secure communication channels to ensure that the digital information is not intercepted, modified and/or compromised in any fashion during transmission.

As the devices the digital information may be presented on have different parameters associated therewith, the semantic interpretation of the digital information may vary from device to device. For certain content (e.g., on-line banking information, on-line secure document viewing) it is important to ensure that the semantic interpretation of the digital information being presented on the device is not different from that which was generated on the server where the content is maintained. When a digital file is created for a document (e.g., a confidential document) a digital signature may be generated for the digital file. The validity of a digital file is authenticated by verifying that the digital signature logically matches the bit string representation of the document. The complexity of the instruments utilized for interpreting the document, creating the digital file, and producing the digital signature determines the precision with which the semantic interpretation is ensured. The ultimate goal for confidential information is to ensure that the semantic interpretation of a digitally signed file can not be changed, either by accident or by intent, this is often referred to as what you see is what you sign (WYSIWYS).

The digital files received by a device may be processed to create the semantic interpretation thereof and in cases where digital signatures are utilized to validate the digital file. The semantic interpretation may be processed and stored in graphics memory in order to present the semantic interpretation on a display thereof. The graphics memory may be randomly accessed which may enable a hacker to access the data to be presented on the display therefrom (which may include confidential information). For example, if a user is viewing their bank account information the hacker may be able to access the graphics memory to access the information being presented on their display.

In order to provide additional security encryption may be utilized. The information may be encrypted by the entity providing the information (e.g., bank server) and decrypted by the device presenting the information. The information contained in the graphics memory of the device may be the encrypted information and the graphics processor may decrypt the information so that information may be presented on the display. Electronic code book (ECB) encryption is the common encryption utilized in graphics processors as it is relatively easy to implement. However, a problem with ECB encryption is that it does a poor job of hiding patterns. ECB encryption has been sufficiently utilized to protect, for example, movies as the images presented are distorted and make the overall experience of watching the movie not enjoyable even though some of the scenes may be clearly visible.

Text within confidential information, such as banking information, encrypted using standard ECB encryption may still be visible to the human eye and/or optical character recognition (OCR) products. Accordingly, ECB encrypted confidential information may still be susceptible to a hacker accessing the information from graphics memory prior to decrypting.

BRIEF DESCRIPTION OF THE DRAWINGS

The features and advantages of the various embodiments will become apparent from the following detailed description in which.

DETAILED DESCRIPTION

Figure 1:
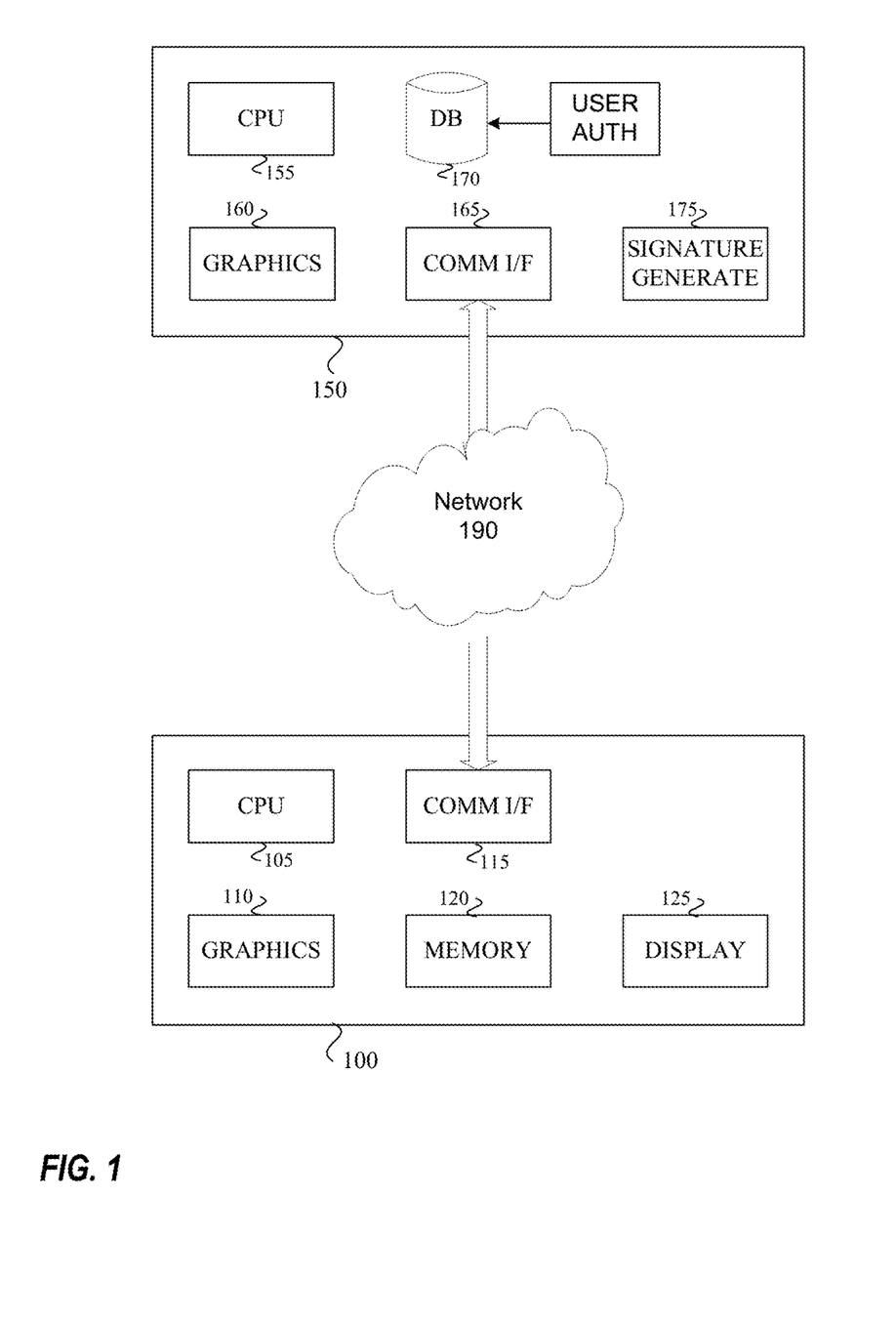
FIG. 1 illustrates a high level functional diagram of a user using a device to access confidential information from a server.

FIG. 1 illustrates a high level functional diagram of a user using a device 100 to access confidential information from a server 150. For example, the user may be a customer of a bank and the server 150 may be operated by the bank. The server 150 may be a digital signature system that utilizes digital signatures to authenticate the validity of the digital documents and the semantic interpretation of the digital information. The server 150 may be a what you see is what you sign (WYSIWYS) system that ensures the semantic interpretation of a digitally signed file can not be changed, either by accident or by intent. The device 100 may connect to and communicate with the server 150 via a communication network (e.g., Internet) 190.

The server 150 may include a processor (CPU) 155, a graphics processor (GPU) 160, a communication interface

165, one or more databases 170, and a digital signature generator 175. The CPU 155 may control the operations of the server 150. The GPU 160 may control the generation of images (e.g., graphics) associated with different information to be presented to a user. The GPU 160 may encrypt the images prior to the images being transmitted. The current encryption utilized by the GPU 160 for information provided to users may be electronic code book (ECB). The communication interface 165 may enable communications with the network 190 and provide secure communications with the device 100. The database(s) 170 may store information for various users. The database(s) 170 may require user authentication (e.g., username, password) in order to provide a user access to their information. The digital signature generator 175 may generate the digital signature for digital files, and the semantic interpretation thereof, that need to be validated.

The device 100 may include a CPU 105, a GPU 110, a communication interface 115, memory 120, and a display 125. The CPU 105 may control the operations of the device 100. The GPU 110 may control the generation of images (e.g., graphics) to be presented on the display 125, including information provided by the server 150. The GPU 110 may decrypt encrypted images prior to the images being presented on the display 125. The current decryption utilized by the GPU 110 may be ECB. The communication interface 115 may enable communications with the network 190 and provide secure communications with the server 150. The memory 120 may include a frame buffer (not separately illustrated) for storing the content (including encrypted content) to be presented on the display 125. The display 125 may present the content.

Figure 2:
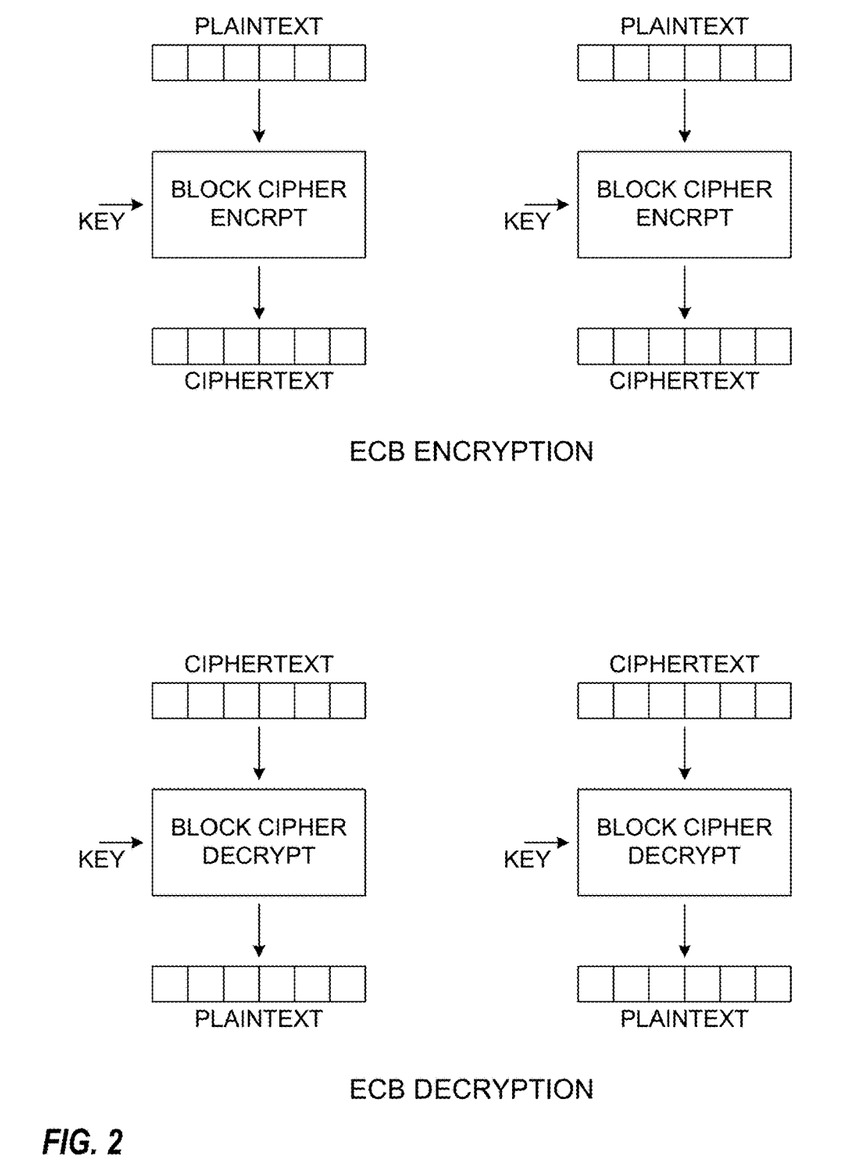
FIG. 2 illustrates a high level diagram of ECB encryption and decryption.

FIG. 2 illustrates a high level diagram of ECB encryption and decryption. ECB is a simple encryption mode that entails dividing content into blocks of a set size and separately encrypting/decrypting each block. As illustrated, to encrypt content (plaintext) the content is divided into a plurality of plaintext blocks and each block of plaintext is provided to a block cipher for encryption using a secret key. The result of the block cipher encryption for each block of plaintext is a corresponding block of ciphertext. The ciphertext blocks can be combined to create the encrypted content (ciphertext). To decrypt content (ciphertext) the content is divided into a plurality of ciphertext blocks and each block of ciphertext is provided to a block cipher for decryption using the secret key. The result of the block cipher decryption for each block of ciphertext is a corresponding block of plaintext. The plaintext blocks can be combined to recreate the content (plaintext).

Figure 3:
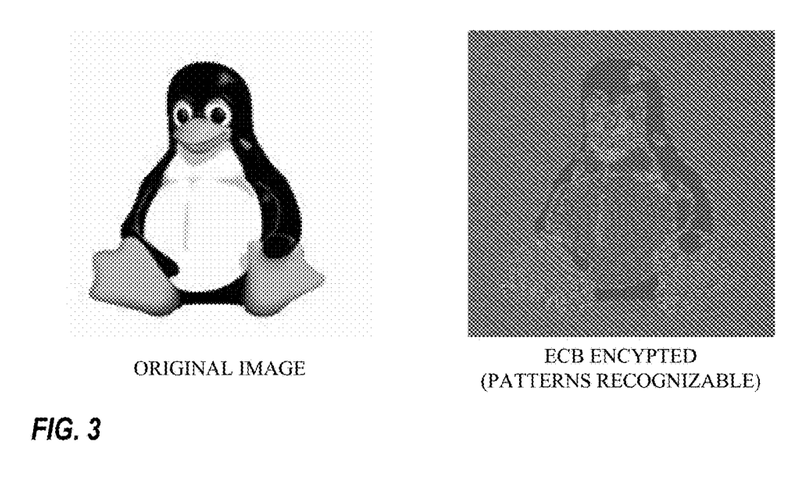
FIG. 3 illustrates an example image (plaintext) and the image after ECB encryption (ciphertext)

A disadvantage of the ECB encryption method is that identical plaintext blocks are encrypted into identical ciphertext blocks so that patterns in the plaintext are not hidden very well in the ciphertext. FIG. 3 illustrates an example image (plaintext) and the image after ECB encryption (ciphertext). While the encrypted image is clearly distorted the penguin from the original image can clearly be made out in the encrypted image. One can see how confidential information (e.g., bank account number, social security number) contained on a document could still be visible to the human eye and/or optical character recognition (OCR) products even if it was encrypted using ECB encryption.

Accordingly, a hacker could access the encrypted information from graphics memory prior to decrypting for presentation on the display and still access the confidential information. Therefore, even though the information may be provided over a secure communications channel and the information may be verified with digital signatures the confidential information is still susceptible to attack on the users' device. The hacker could detect that you are communicating with a secure site (e.g., bank server) and while not being able to intercept the communications may access your graphics memory to see the encrypted version of the content that you are displaying (e.g., on-line bank statement). The hacker could extract the confidential information therefrom visually or using OCR products.

In order to protect confidential information from this type of attack the patterns in the encrypted data need to be hidden. Different encryption schemes (more complex) could be utilized but this would require hardware changes to current graphics products (e.g., GPU) that currently utilize ECB encryption and are utilized in, for example, consumer electronic devices. According to one embodiment, the patterns may be hidden using ECB encryption by injecting noise into the image before it is encrypted. The noise may be the modification of different values (e.g., red, green, blue) associated with different pixels in the image. While the injection of the noise may modify the image the modified image may be perceptually similar, if not very similar, to the original image. However, the modified image may provide randomness in the pixels such that the encryption of plaintext blocks of the image results in ciphertext blocks that are randomized and a resultant encrypted image where the patterns are not detectable. That is, the introduction of noise may not significantly alter the perceived look of the image (plaintext) but may significantly alter the resulting ECB encrypted image (ciphertext).

Figure 4:
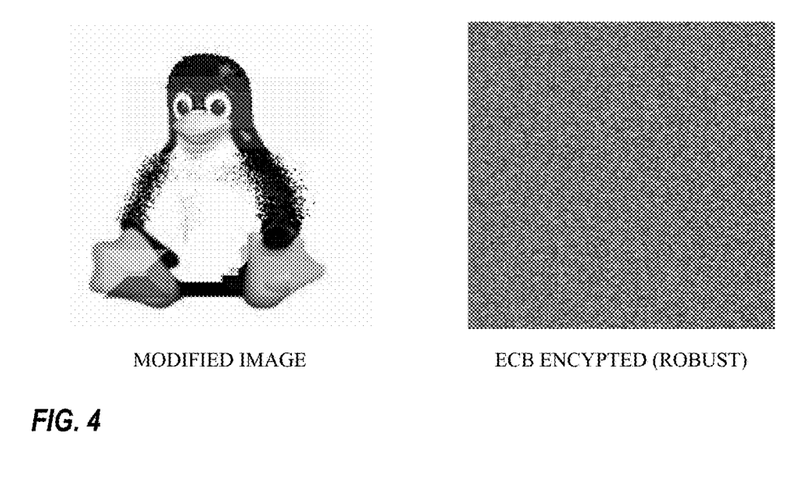
FIG. 4 illustrates the example image of FIG. 3 after noise is injected and the resulting ECB encrypted image, according to one embodiment.

FIG. 4 illustrates the example image of FIG. 3 after noise is injected and the resulting ECB encrypted image. The modifications to the image after application of noise are exaggerated to illustrate that modifications have been made. However, even with the exaggerated modifications the image is still perceptually similar. The resulting ECB encrypted image (ciphertext) is very robust in that the patterns are no longer visible and a rather arbitrary image of static is generated.

Figure 5A:
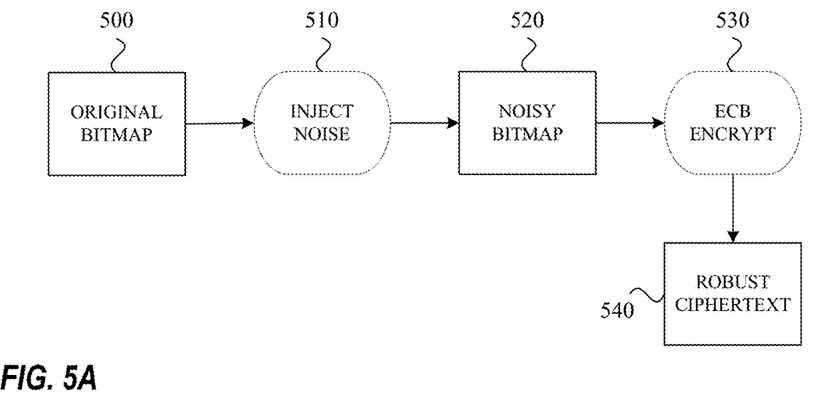
FIG. 5A illustrates an example high level flow for creating a robust ciphertext using ECB encryption, according to one embodiment.

FIG. 5A illustrates an example high level flow for creating a robust ciphertext using ECB encryption. Initially, a bitmap is generated for an image (original bitmap) 500. The original bitmap is subject to noise injection (pixel modification) 510 to create a modified (noisy) bitmap 520. The noisy bitmap is then subject to ECB encryption 530 to create a robust ciphertext where patterns and/or text in the image are not ascertainable 540. Accordingly, if the ciphertext is in graphics memory for decrypting and presentation on a display a hacker would not be able to extract any useable data therefrom. When the robust ciphertext is decrypted the noisy bitmap will be generated.

Figure 5B:
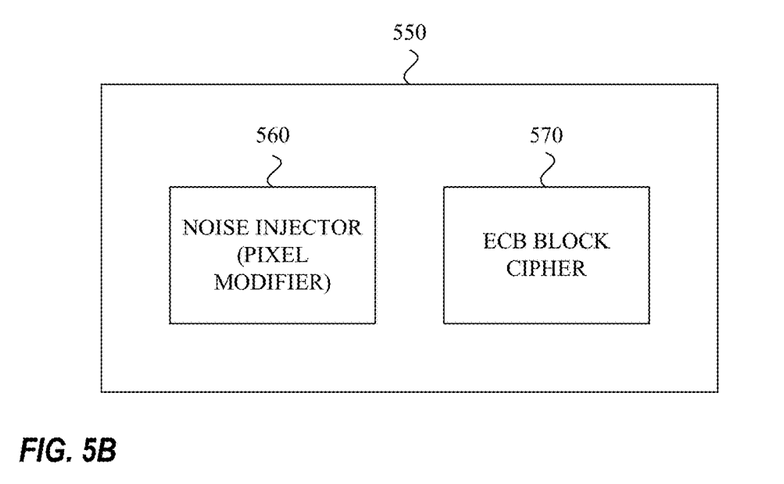
FIG. 5B illustrates an example high level system for creating a robust ECB ciphertext, according to one embodiment.

FIG. 5B illustrates an example high level system 550 for creating a robust ECB ciphertext. The system 550 includes a noise injector 560 and a ECB block cipher 570. The noise injector 560 is to modify the pixels of a bitmap of an image to be presented. The ECB block cipher 570 is to encrypt the modified bit map. The ECB block cipher 570 may be part of a GPU. According to one embodiment, the noise injector 560 may be integrated into the GPU.

Referring back to FIG. 1, the robust ciphertext may be generated in the server 100 by the GPU 160 and transmitted to the device 100. The ciphertext may be stored in graphics memory 120 of the device 100 and then decrypted by the GPU 110 so that the plaintext may be presented on the display 125.

The injection of noise (modification of pixels) may be done in any number of manners. The noise may be added to the image prior to the image being segregated into blocks for encryption or may be added to each block slated for encryption prior to the actual encryption. The noise may be added to, for example, each pixel, to a defined subset or pattern of pixels (e.g., every eighth pixel), to random pixels, or to each block of pixels. The noise may be added to one value (e.g., red, green or blue) of a pixel or to multiple values thereof.

According to one embodiment, the noise may be constant and be added to each image (bit map) prior to encryption. The application of constant noise may include adding defined numbers to the pixel values for all or defined pixels for the image. According to one embodiment, a counter may be utilized to generate a number and the number may be added to the current pixel value for a pixel. According to one embodiment, a random number generator may be utilized to generate a random number and the random number may be added to the current pixel value for a pixel. According to one embodiment, the image may be analyzed so a determination may be made with respect to how the image can be modified to maximize the randomness of the image while ensuring that the modified image remains perceptually similar.

Figure 6A:
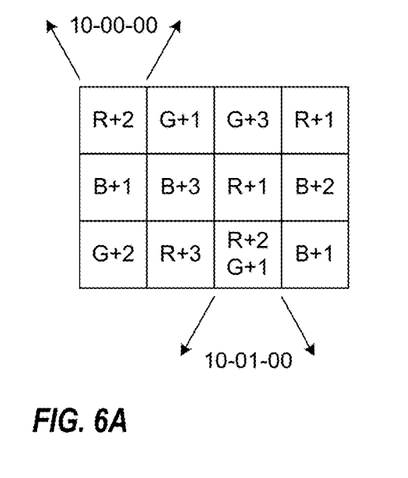
FIGS. 6A-B illustrate simplistic modifications of pixel values for an image, according to one embodiment.
Figure 6B:
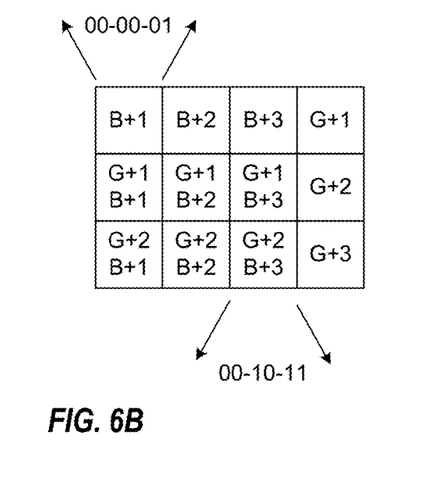

FIGS. 6A-B illustrate simplistic modifications of pixel values for an image. As illustrated the image contains only 12 pixels. Each pixel has a red, green and blue value associated therewith and for simplicity it is assumed that each red, green and blue value can only be increased by up to 3 (using two bits). For ease of illustration the modifications are simply listed as the change to an original pixel value (e.g., R+3). For several of the pixels the bits representing the modifications to the pixel values that have been added to the original bit steam are shown (the—separating the bits is simply to distinguish the bits associated with each RGB value).

FIG. 6A illustrates one or more pixel values being modified for the different pixels. The modification of the pixel values may be based on the application of constant noise (e.g., regardless of the image the pixel values are modified in this fashion), based on random number generation, or based on analysis of the image. By way of example, the upper left pixel had a 10-00-00 bit stream added to the current bit stream resulting in an increase of 2 in the R value.

FIG. 6B illustrates the pixel values being modified based on the use of a counter. Each successive pixel has an increasing bit stream added thereto as the noise. The configuration of the bit stream determines the modification to the original pixel. As illustrated a counter of 1 (00-00-01) results in the blue value for a pixel being increased by 1 and a counter of 11 (00-10-11) results in the blue value for a pixel being increased by 3 and the green value being increased by 2.

Figure 7:
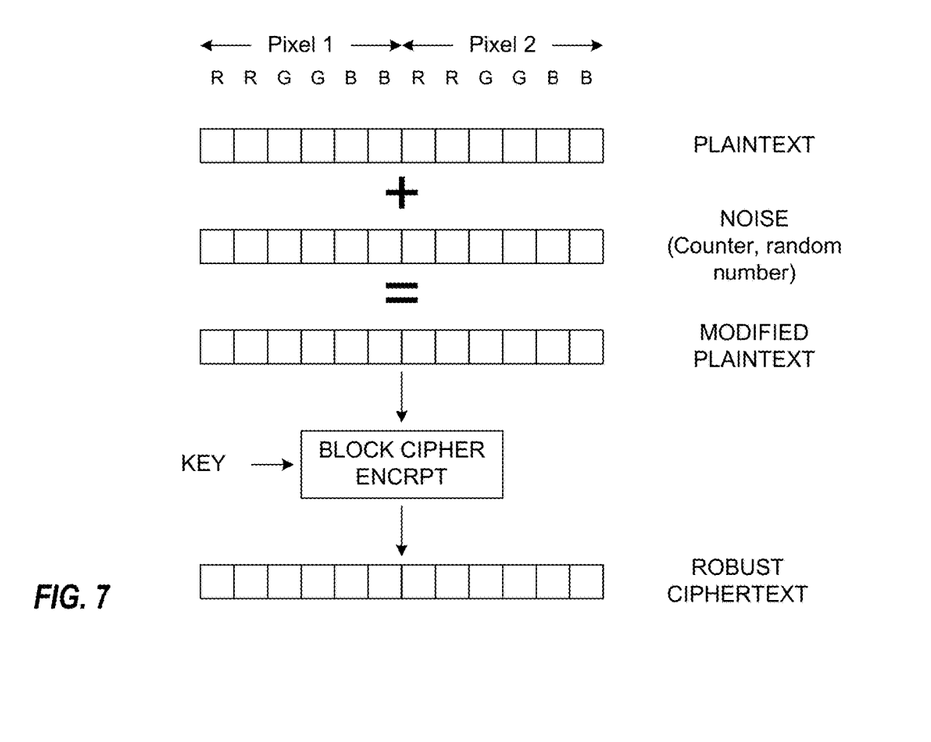
FIG. 7 illustrates the noise being inserted into the bitmap for an image at the block level, according to one embodiment.

FIG. 7 illustrates the noise being inserted into the bitmap for an image at the block level (as opposed to at the pixel level). For ease of illustration the block level is shown as two pixels and each pixel value only includes two bits. A bit map representing noise is added to the plaintext block of the original image to generate a modified plaintext block. The modified plaintext is provided to a block cipher for encryption using a secret key. The result of the block cipher encryption for each block of modified plaintext is a corresponding block of robust ciphertext. The noise applied may be, for example, based on a counter or may be randomly generated. The bit stream associated with the noise may modify one or more pixel values for one or more pixels.

While the injection of noise into a bitmap prior to ECB encryption of the image to hide patterns typically visible in ECB encryption was described with respect to confidential content being transmitted to a user via a digital signature system (e.g., bank), it is not limited thereto. Rather, the injection of noise into the bitmap prior to ECB encryption can be performed on any confidential content that may be stored in graphics memory and therefore susceptible to external hacking.

The injection of noise into a bitmap prior to ECB encryption described above in FIGS. 4-7 may be implemented, for example, in a GPU (e.g., 110, 160 of FIG. 1), an integrated circuit, circuitry or discrete components or some combination thereof. Furthermore, the operations may be implemented in hardware, software, firmware or some combination thereof. The GPU may have access to device readable storage (on the device, off the device, or some combination thereof) that contains instructions that when executed by the device causes the device to perform at least a subset of the operations described above in FIGS. 4-7.

The various embodiments described above may be implemented in various systems that display content (content display systems) and the content display systems may be incorporated in various devices.

Figure 8:
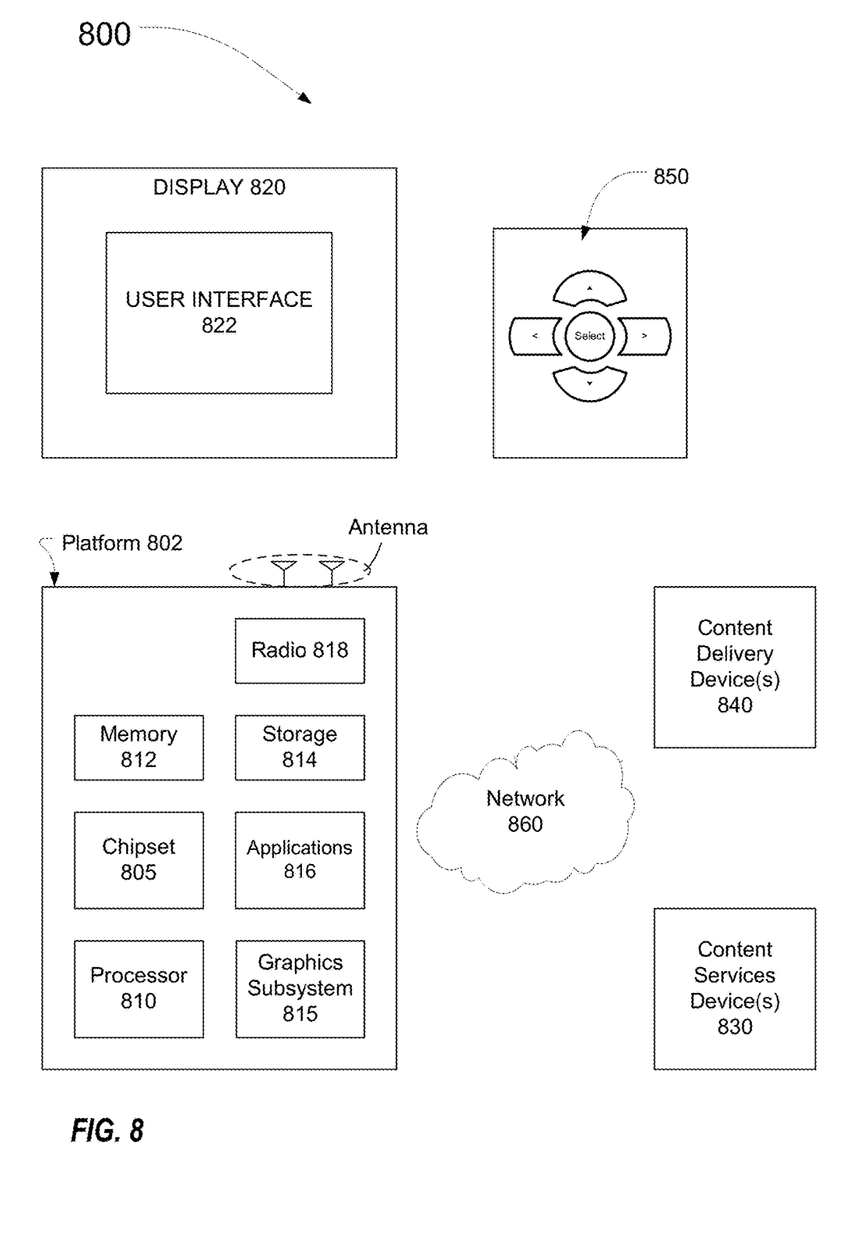
FIG. 8 illustrates an example content display system, according to one embodiment.

FIG. 8 illustrates an example content display system 800. The system 800 may be a media system although it is not limited to this context. The system 800 may be incorporated into, for example, a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 800 comprises a platform 802 coupled to an external display 820. The platform 802 may receive content from a content device such as content services device(s) 830, content delivery device(s) 840 or other similar content sources. A navigation controller 850 comprising one or more navigation features may be used to interact with, for example, the platform 902 and/or the display 820.

In embodiments, the platform 802 may comprise any combination of a chipset 805, a processor 810, memory 812, storage 814, a graphics subsystem 815, applications 816 and/or a radio 818. The chipset 805 may provide intercommunication among the processor 810, the memory 812, the storage 814, the graphics subsystem 815, the applications 816 and/or the radio 818. The chipset 805 may, for example, include a storage adapter (not depicted) capable of providing intercommunication with the storage 814.

The processor 810 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 810 may comprise dual-core processor(s), dual-core mobile processor(s), and so forth.

The memory 812 may be implemented as a volatile memory device such as, but not limited to, a Random Access Memory (RAM), Dynamic Random Access Memory (DRAM), or Static RAM (SRAM).

The storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, the storage 814 may comprise technology to increase the storage performance or enhanced protection for valuable digital media when multiple hard drives are included, for example.

The graphics subsystem 815 may perform processing of images such as still or video for display. The graphics subsystem 815 may be a graphics processing unit (GPU) or a visual processing unit (VPU), for example. An analog or digital interface may be used to communicatively couple the graphics subsystem 815 and the display 820. For example, the interface may be any of a High-Definition Multimedia Interface, DisplayPort, wireless HDMI, and/or wireless HD compliant techniques. The graphics subsystem 815 could be integrated into the processor 810 or the chipset 805. The graphics subsystem 815 could be a stand-alone card communicatively coupled to the chipset 805.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 818 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, the radio 818 may operate in accordance with one or more applicable standards in any version.

In embodiments, the display 820 may comprise any television type monitor or display. The display 820 may comprise, for example, a computer display screen, touch screen display, video monitor, television-like device, and/or a television. The display 820 may be digital and/or analog. In embodiments, the display 820 may be a holographic display. Also, the display 820 may be a transparent surface that may receive a visual projection. Such projections may convey various forms of information, images, and/or objects. For example, such projections may be a visual overlay for a mobile augmented reality (MAR) application. Under the control of one or more software applications 816, the platform 802 may display the user interface 822 on the display 820.

In embodiments, the content services device(s) 830 may be hosted by any national, international and/or independent service and thus accessible to the platform 802 via the Internet, for example. The content services device(s) 830 may be coupled to the platform 802 and/or to the display 820. The platform 802 and/or the content services device(s) 830 may be coupled to a network 860 to communicate (e.g., send and/or receive) media information to and from the network 860. The content delivery device(s) 840 also may be coupled to the platform 802 and/or to the display 820.

In embodiments, the content services device(s) 830 may comprise a cable television box, personal computer, network, telephone, Internet enabled devices or appliance capable of delivering digital information and/or content, and any other similar device capable of unidirectionally or bidirectionally communicating content between content providers and the platform 802 and/or the display 820, via the network 860 or directly. It will be appreciated that the content may be communicated unidirectionally and/or bidirectionally to and from any one of the components in the system 800 and a content provider via the network 860. Examples of content may include any media information including, for example, video, music, medical, gaming information, and so forth.

The content services device(s) 830 receives content such as cable television programming including media information, digital information, and/or other content. Examples of content providers may include any cable or satellite television or radio or Internet content providers. The provided examples are not meant to limit embodiments of the invention.

In embodiments, the platform 802 may receive control signals from navigation controller 850 having one or more navigation features. The navigation features of the controller 850 may be used to interact with the user interface 822, for example. In embodiments, the navigation controller 850 may be a pointing device that may be a computer hardware component (specifically human interface device) that allows a user to input spatial (e.g., continuous and multi-dimensional) data into a computer. Many systems such as graphical user interfaces (GUI), televisions and monitors allow the user to control and provide data to the computer or television using physical gestures.

Movements of the navigation features of the controller 850 may be echoed on a display (e.g., display 820) by movements of a pointer, cursor, focus ring, or other visual indicators displayed on the display. For example, under the control of software applications 816, the navigation features located on the navigation controller 850 may be mapped to virtual navigation features displayed on the user interface 822, for example. In embodiments, the controller 850 may not be a separate component but integrated into the platform 802 and/or the display 820. Embodiments, however, are not limited to the elements or in the context shown or described herein.

In embodiments, drivers (not shown) may comprise technology to enable users to instantly turn on and off the platform 802 like a television with the touch of a button after initial boot-up, when enabled, for example. Program logic may allow the platform 802 to stream content to media adaptors or other content services device(s) 830 or content delivery device(s) 840 when the platform is turned "off." In addition, the chipset 805 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 800 may be integrated. For example, the platform 802 and the content services device(s) 830 may be integrated, or the platform 802 and the content delivery device(s) 840 may be integrated, or the platform 802, the content services device(s) 830, and the content delivery device(s) 840 may be integrated, for example. In various embodiments, the platform 802 and the display 820 may be an integrated unit. In various embodiments, the display 820 and the content service device(s) 830 may be integrated, or the display 820 and the content delivery device(s) 840 may be integrated, for example. These examples are not meant to limit the invention.

In various embodiments, the system 800 may be implemented as a wireless system, a wired system, or a combination of both. When implemented as a wireless system, the system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, the system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
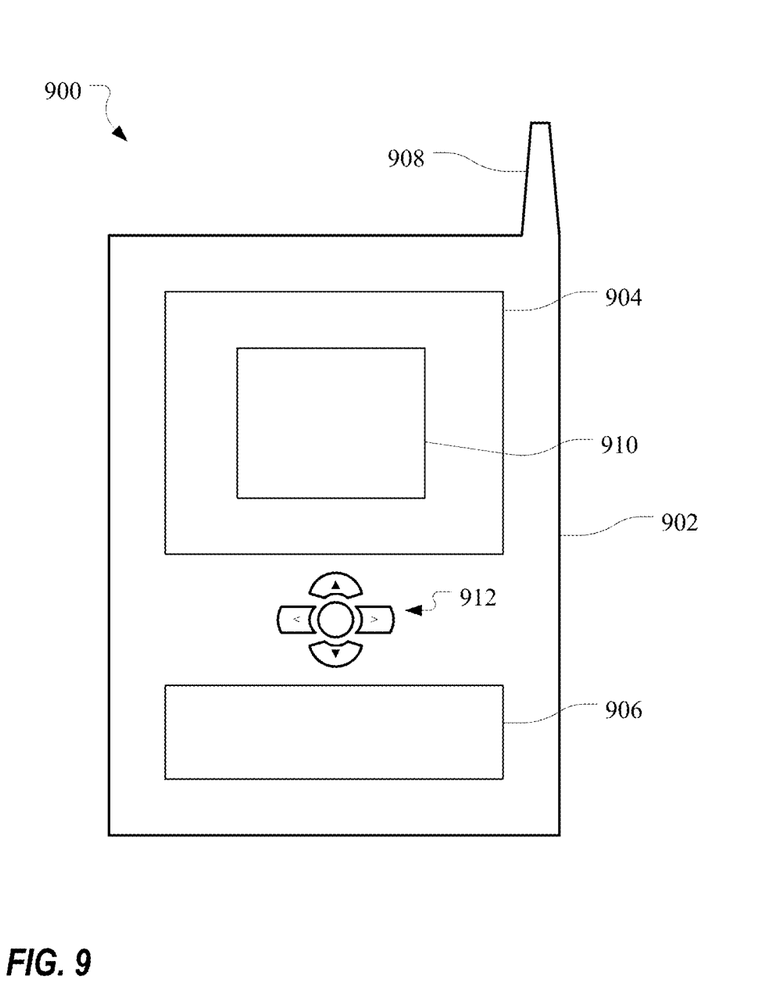
FIG. 9 illustrates an example small form factor device in which the system of FIG. 8 may be embodied, according to one embodiment.

As described above, the system 800 may be embodied in varying physical styles or form factors. FIG. 9 illustrates embodiments of a small form factor device 900 in which the system 800 may be embodied. In embodiments, for example, the device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example the mobile computing device may be utilized in a vehicle (e.g., car, truck, van). The in-vehicle device may provide information and/or entertainment to occupants of the vehicle (in-vehicle infotainment (IVI) device). The IVI device may utilize power from the vehicle as an external power source in addition to, or in place of, an internal battery powering the device.

In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The device 900 may comprise a housing 902, a display 904, an input/output (I/O) device 906, and an antenna 908. The device 900 also may comprise navigation features 912. The display 904 may comprise any suitable display unit for displaying information appropriate for a mobile computing device. The I/O device 906 may comprise any suitable I/O device for entering information into a mobile computing device. Examples for the I/O device 906 may include an alphanumeric keyboard, a numeric keypad, a touch pad, input keys, buttons, switches, rocker switches, microphones, speakers, voice recognition device and software, and so forth. Information also may be entered into the device 900 by way of microphone. Such information may be digitized by a voice recognition device. The embodiments are not limited in this context. The device 900 may include a battery (not illustrated) to provide power thereto. The battery may be located in the device 900 (e.g., within the housing 902) and/or may be remote from the device 900 (e.g., vehicle battery utilized for IVI device).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. A hardware graphics processor to:
modify, prior to encryption using electronic code book (ECB) encryption, pixel values for at least a subset of pixels in a bitmap of an image to create a noisy bitmap of the image, wherein the noisy bitmap of the image retains perceptual similarity to the bitmap of the image, and wherein the perceptual similarity is based on a determination that the bitmap and the noisy bitmap are perceptually correlated by at least one of a human eye or an optical character recognition (OCR) device; and
encrypt the noisy bitmap using ECB encryption to create an encrypted image thereof, wherein the encrypted image does not retain perceptual similarity to the bitmap of the image and does not include a visually recognizable pattern from the image.

2. The hardware graphics processor of claim 1, wherein the pixel values are modified for the at least the subset of the pixels by adding a counter value to current pixel values.

3. The hardware graphics processor of claim 1, wherein the pixel values are modified for the at least the subset of the pixels by adding a random number to current pixel values.

4. The hardware graphics processor of claim 1, wherein the pixel values are modified for the at least the subset of the pixels by adding a predefined noise pattern into the bitmap.

5. The hardware graphics processor of claim 1, wherein the graphics processor is further to:
analyze the bitmap to determine how the bitmap can be modified to maximize the randomness of the bitmap while ensuring that the noisy bitmap retains perceptual similarity to the bitmap of the image; and
modify the pixel values based on the analysis.

6. The hardware graphics processor of claim 1, wherein the graphics processor is further to decrypt the encrypted image using ECB decryption to obtain the noisy bitmap of the image.

7. An apparatus comprising:
graphics memory to store information to be presented on a display including at least one non-patterned encrypted image, wherein the at least one non-patterned encrypted image was encrypted using electronic code book (ECB) encryption but does not retain perceptual similarity to an associated at least one image prior to encryption, because the ECB encryption was performed on a noisy version of the at least one image, wherein the at least one non-patterned encrypted image does not include a visually recognizable pattern from the image, wherein the noisy version was created by modifying, prior to encryption, pixel values for at least a subset of pixels in a bitmap of the associated at least one image to retain perceptual similarity to a bitmap of the associated at least one image, wherein perceptual similarity is based on a determination that the bitmap and the noisy bitmap are perceptually correlated by at least one of a human eye or an optical character recognition (OCR) device; and
a graphics processor to decrypt the encrypted image using ECB decryption to obtain the noisy version of the at least one image, wherein the noisy version of the at least one image retains perceptual similarity to the associated at least one image.

8. The apparatus of claim 7, wherein when the graphics memory is randomly accessed by a hacker attempting to obtain confidential information the non-patterned encrypted image stored in the graphics memory will not provide any visually recognizable patterns from which the hacker can ascertain the confidential information.

9. The apparatus of claim 7, wherein the graphics processor is further to modify the pixel values for the at least a subset of the pixels in the bitmap of the associated at least one image to create the noisy version of the at least one image, and wherein perceptual similarity is based on a determination that the bitmap and the noisy bitmap can be perceptually correlated by at least one of a human eye and an optical character recognition (OCR) device; and
encrypt the noisy version of the at least one image using ECB encryption to create the at least one non-patterned encrypted image thereof.

10. The apparatus of claim 9, wherein the graphics processor is to modify the pixel values by adding a counter value to current pixel values.

11. The apparatus of claim 9, wherein the graphics processor is to modify the pixel values by adding a random number to current pixel values.

12. The apparatus of claim 9, wherein the graphics processor is to modify the pixel values by adding a predefined noise pattern into the bitmap.

13. The apparatus of claim 9, wherein the graphics processor is further to:
analyze the bitmap to determine how the bitmap can be modified to maximize the randomness of the bitmap while ensuring that the noisy bitmap retains perceptual similarity to the bitmap; and
modify the pixel values based on the analysis.

14. A non-transitory, computer readable storage medium storing instructions that when executed by a processer cause the processor to:
modify, prior to encryption using electronic code book (ECB) encryption, pixel values for at least a subset of pixels in a bitmap of an image to create a noisy bitmap of the image, wherein the noisy bitmap of the image retains perceptual similarity to the bitmap of the image, wherein perceptual similarity is based on a determination that the bitmap and the noisy bitmap are perceptually correlated by at least one of a human eye or an optical character recognition (OCR) device; and
encrypt the noisy bitmap using ECB encryption to create an encrypted image thereof, wherein the encrypted image does not retain perceptual similarity to the bitmap of the image and does not include a visually recognizable pattern from the image.

15. The non-transitory, computer readable storage medium of claim 14, wherein when executed by the processor the instructions cause the processor to modify the pixel values by adding a counter value to the pixel values.

16. The non-transitory, computer readable storage medium of claim 14, wherein when executed by the processor the instructions cause the processor to modify the pixel values by applying a known pattern to the bitmap.

17. The non-transitory, computer readable storage medium of claim 14, wherein when executed by the processor the instructions cause the processor to modify the pixel values by adding a random number to the pixel values.

18. The non-transitory, computer readable storage medium of claim 14, wherein when executed by the processor the instructions further cause the processor to:
analyze the bitmap to determine how the bitmap can be modified to maximize the randomness of the bitmap while ensuring that the noisy bitmap retains perceptual similarity to the bitmap; and modify the pixel values based on the analysis.

19. The non-transitory, computer readable storage medium of claim 14, wherein when executed by the processor the instructions cause the processor to modify pixel values for a block of pixels prior to the block being encrypted.

20. The non-transitory, computer readable storage medium of claim 14, wherein when executed by the processor the instructions further cause the processor to:

store the encrypted image in graphics memory in preparation for presentation on a display;

decrypt the encrypted image to recreate the noisy bitmap; and display the noisy bitmap on the display.

* * * * *